United States Patent
Pepin et al.

(10) Patent No.: US 11,371,902 B2
(45) Date of Patent: Jun. 28, 2022

(54) PROCESS VENTING FEATURE FOR USE IN SENSOR APPLICATIONS WITH A PROCESS FLUID BARRIER

(71) Applicant: Rosemount Inc., Shakopee, MN (US)

(72) Inventors: Nathan R. Pepin, Wenatchee, WA (US); Michael A. Knopf, East Wenatchee, WA (US); James Walters, III, Malaga, WA (US); David A. Andrew, Wenatchee, WA (US); David Cutter, East Wenatchee, WA (US)

(73) Assignee: Rosemount Inc., Shakopee, MN (US)

( * ) Notice: Subject to any disclaimer, the term of this patent is extended or adjusted under 35 U.S.C. 154(b) by 230 days.

(21) Appl. No.: 16/728,176

(22) Filed: Dec. 27, 2019

(65) Prior Publication Data

US 2021/0199530 A1 Jul. 1, 2021

(51) Int. Cl.
*G01L 19/00* (2006.01)
*G01L 27/00* (2006.01)

(52) U.S. Cl.
CPC ...... *G01L 19/0023* (2013.01); *G01L 19/0038* (2013.01); *G01L 27/005* (2013.01)

(58) Field of Classification Search
USPC .................................................. 73/700–756
See application file for complete search history.

(56) References Cited

U.S. PATENT DOCUMENTS

| | | |
|---|---|---|
| 1,786,101 A | 12/1930 | Welch et al. |
| 3,374,674 A | 3/1968 | Schwartzman |
| 3,821,897 A | 7/1974 | Frazel |
| 4,263,115 A | 7/1981 | Kessler et al. |
| 4,294,124 A | 10/1981 | Kalwaitis |
| 4,297,871 A | 11/1981 | Wright |
| 4,305,286 A | 12/1981 | Beuth et al. |
| 4,599,906 A | 7/1986 | Freud et al. |

(Continued)

FOREIGN PATENT DOCUMENTS

| | | | | |
|---|---|---|---|---|
| CN | 101310235 B | * | 2/2012 | ......... G01L 19/0618 |
| DE | 102015215991 B3 | * | 1/2017 | ............. G01D 11/24 |

(Continued)

OTHER PUBLICATIONS

"90 | Wireless Monitoring Solution for Stackable Totes/Tanks" TankLink, a Division of Telular Corporation, available at www.TankLink.com, Copyright 2012 (2 pages).

(Continued)

*Primary Examiner* — Andre J Allen
(74) *Attorney, Agent, or Firm* — Christopher R. Christenson; Kelly, Holt & Christenson PLLC

(57) ABSTRACT

A pressure transmitter includes a housing and a pressure sensor having an electrical characteristic that varies with applied pressure. The pressure sensor is configured to generate a sensor signal indicative of process fluid pressure. A transmitter isolation diaphragm is configured to couple to a process barrier seal to convey pressure to the pressure sensor. A flange is coupled to the transmitter isolation diaphragm. The flange includes at least one gas pathway extending inwardly from an outer diameter of the transmitter isolation diaphragm. Electronics are coupled to the pressure sensor to receive the sensor signal and to generate an output indicative of the pressure.

20 Claims, 8 Drawing Sheets

(56) References Cited

U.S. PATENT DOCUMENTS

| | | |
|---|---|---|
| 4,989,456 A | 2/1991 | Stupecky |
| 5,460,049 A | 10/1995 | Kirsch |
| 5,481,920 A | 1/1996 | Nara |
| 5,595,939 A | 1/1997 | Otake et al. |
| 5,993,395 A | 11/1999 | Shulze |
| 6,050,145 A | 4/2000 | Olson et al. |
| 6,602,401 B1 | 8/2003 | Feng |
| 6,894,502 B2 | 5/2005 | Feng et al. |
| 6,979,307 B2 | 12/2005 | Beretta |
| 7,252,009 B2 | 8/2007 | Kosh et al. |
| 7,258,017 B1 | 8/2007 | Hedtke |
| 7,924,017 B2 | 4/2011 | Ammann et al. |
| 7,972,495 B1 | 7/2011 | Millar et al. |
| 8,123,397 B2 | 2/2012 | Baumfalk et al. |
| 8,252,582 B2 | 8/2012 | Baumfalk et al. |
| 8,304,231 B2 | 11/2012 | Roll |
| 8,640,560 B2 | 2/2014 | Burke |
| 8,828,202 B2 | 9/2014 | Feng |
| 8,900,855 B2 | 12/2014 | Feng et al. |
| 9,029,130 B2 | 5/2015 | Feng et al. |
| 9,239,114 B2 | 1/2016 | Lee |
| 9,267,100 B2 | 2/2016 | Selker et al. |
| 9,335,000 B2 | 5/2016 | Selker et al. |
| 9,562,819 B2 | 2/2017 | Fadell et al. |
| 10,226,076 B2 | 3/2019 | Althorpe |
| 2001/0028865 A1 | 10/2001 | Cummings et al. |
| 2002/0072084 A1 | 6/2002 | Meserol et al. |
| 2003/0168403 A1 | 9/2003 | Corcho-Sanchez et al. |
| 2004/0027912 A1 | 2/2004 | Bibbo et al. |
| 2004/0140211 A1 | 7/2004 | Broy et al. |
| 2005/0163667 A1 | 7/2005 | Krause |
| 2005/0193825 A1 | 9/2005 | Otsuka |
| 2005/0256447 A1 | 11/2005 | Richardson et al. |
| 2006/0228804 A1 | 10/2006 | Xu et al. |
| 2007/0151349 A1 | 7/2007 | Schumacher et al. |
| 2007/0185960 A1 | 8/2007 | Kambe et al. |
| 2007/0227254 A1 | 10/2007 | Nagasawa et al. |
| 2007/0252290 A1 | 11/2007 | Teremtiev et al. |
| 2007/0272027 A1 | 11/2007 | Hedtke |
| 2008/0032389 A1 | 2/2008 | Selker et al. |
| 2008/0274541 A1 | 11/2008 | Selker et al. |
| 2009/0130704 A1 | 5/2009 | Gyure |
| 2009/0139298 A1 | 6/2009 | Klees et al. |
| 2010/0017159 A1 | 1/2010 | Burke |
| 2010/0302008 A1 | 12/2010 | Engelstad et al. |
| 2011/0187388 A1 | 8/2011 | Ossart |
| 2011/0201100 A1 | 8/2011 | Proulx |
| 2011/0249526 A1 | 10/2011 | Wong |
| 2012/0016603 A1 | 1/2012 | Martin et al. |
| 2012/0234097 A1 | 9/2012 | Petersen |
| 2012/0240686 A1 | 9/2012 | Blomberg et al. |
| 2012/0242993 A1 | 9/2012 | Schick et al. |
| 2012/0244609 A1 | 9/2012 | Selker et al. |
| 2012/0290268 A1 | 11/2012 | Bey |
| 2012/0291238 A1 | 11/2012 | Frej et al. |
| 2013/0055821 A1 | 3/2013 | Bentley |
| 2013/0145818 A1 | 6/2013 | Allgauer et al. |
| 2014/0207016 A1 | 7/2014 | Addington |
| 2015/0030514 A1 | 1/2015 | Feltham |
| 2015/0283279 A1 | 10/2015 | Lott |
| 2015/0316528 A1 | 11/2015 | Schumacher |
| 2016/0091383 A1 | 3/2016 | Hoffman et al. |
| 2016/0298068 A1 | 10/2016 | Schumacher et al. |
| 2018/0179486 A1 | 6/2018 | Fadell et al. |

FOREIGN PATENT DOCUMENTS

| | | |
|---|---|---|
| EP | 0399227 A1 | 11/1990 |
| EP | 0753737 A2 | 1/1997 |
| EP | 2065701 A2 | 6/2009 |
| GB | 2364125 A | 1/2002 |
| JP | 2008-039523 A | 2/2008 |
| JP | 2009-519440 A | 5/2009 |
| WO | 1992/001218 A1 | 1/1992 |
| WO | 2009/017765 A1 | 2/2009 |
| WO | 2009/146323 A1 | 12/2009 |
| WO | 2013/034891 A1 | 3/2013 |
| WO | 2013/162394 A1 | 10/2013 |
| WO | 2008/016411 A1 | 2/2018 |

OTHER PUBLICATIONS

"90 | Wireless Monitoring Solution for Highly Corrosive Chemicals", TankLink, a Division of Telular Corporation, available at www.TankLink.com, Copyright 2013 (2 pages).

First Office Action for Chinese Patent Application No. 201510197804.X, dated Jan. 26, 2017, 21 pages including English translation.

Patent Examination Report No. 1 far Australian Patent Application No. 2015253275, dated Nov. 15, 2016, 4 pages.

International Preliminary Report on Patentability for International Patent Application No. PCT/US2015/028192, dated Nov. 17, 2016, 15 pages.

Office Action for Canadian Patent Application No. 2818943, dated Jul. 30, 2014, 2 pages.

International Search Report and Written Opinion far International Patent Application No. PCT/US2015/028192, dated Jul. 27, 2015, 18 pages.

International Search Report and Written Opinion from International Patent Application No. PCT/US2011/065032, dated Apr. 26, 2012, 16 pages.

International Search Report and Written Opinion from International Patent Application No. PCT/US2011/065033, dated Mar. 19, 2012, 16 pages.

Pharmaceutical Industry Solutions: Reliable Liquid Analysis, Brochure by Rosemount Analytical, Emerson Process Management, dated 2005, 12 pages.

S. Schmitmeir et al. Development and Characterization of a Small-Scale Bioreactor Based on a Bioartificial Hepatic Culture Model for Predictive Pharmacological In Vitro Screenings, Biotechnology and Bioengineering, vol. 95, No. 6, dated Dec. 20, 2006, 10 pages.

Application Data Sheet, Tighter pH Control in Pharmaceutical Applications, Jan. 2008, by Rosemount Analytical, Emerson Process Management, 2 pages.

International Search Report and Written Opinion for PCT/US2016024859, dated Jul. 12, 2016, 11 pages.

International Search Report and Written Opinion for PCT/US2016/028884, dated Jul. 28, 2016, 16 pages.

International Search Report and Written Opinion for PCT/US2015/064125, dated Mar. 13, 2017, 16 pages.

Related U.S. Appl. No. 15/278,766, "Single-Use Bioreactor Sensor Interface" filed Sep. 28, 2016, 18 pages.

Related U.S. Appl. No. 16/072,128, "Flow Measurement System for Single-Use Containers", filed Mar. 16. 2016, 16 pages.

Second Office Action for Chinese Patent Application No. 201180059710.06, dated Aug. 22, 2014. 12 pages with English translation.

Office Action for Chinese Patent Application No. 201180059710.06, dated Feb. 24, 2014, 12 pages with English translation.

Theory and Practice of pH Measurement, PN 44-6033/rev. D. dated Dec. 2010 by Rosemount Analytical, Emerson Process Management, 40 pages.

First Office Action for Chinese Patent Application No. 201210085580.X. dated Jun. 11, 2014, 14 pages including English translation.

"A low-cost system for real time monitoring and assessment of potable water quality at consumer sites", 2013 IEEE Sensors, IEEE, Oct. 28, 2012, pp. 1-4.

International Search Report and Written Opinion for International Patent Application No. PCTUS2017/019563, dated May 25, 2017, 13 pages.

Office Action for Japanese Patent Application No. 2016-565389, dated Sep. 19, 2017, 7 pages including English translation.

Second Office Action for Chinese Patent Application No. 201510197804.X, dated Sep. 29, 2017, 13 pages including English translation.

First Chinese Office Action dated Nov. 29, 2019, for Chinese Patent Application No. 201710674847.1, 16 pages including English Translation.

(56) References Cited

OTHER PUBLICATIONS

International Search Report and Written Opinion dated Jun. 22, 2018, for International Patent Application No. PCT/US2018/014961, 14 pages.
International Search Report and Written Opinion, dated Apr. 6, 2021, for International Patent Application No. PCT/US2020/065860, 12 pages.

* cited by examiner

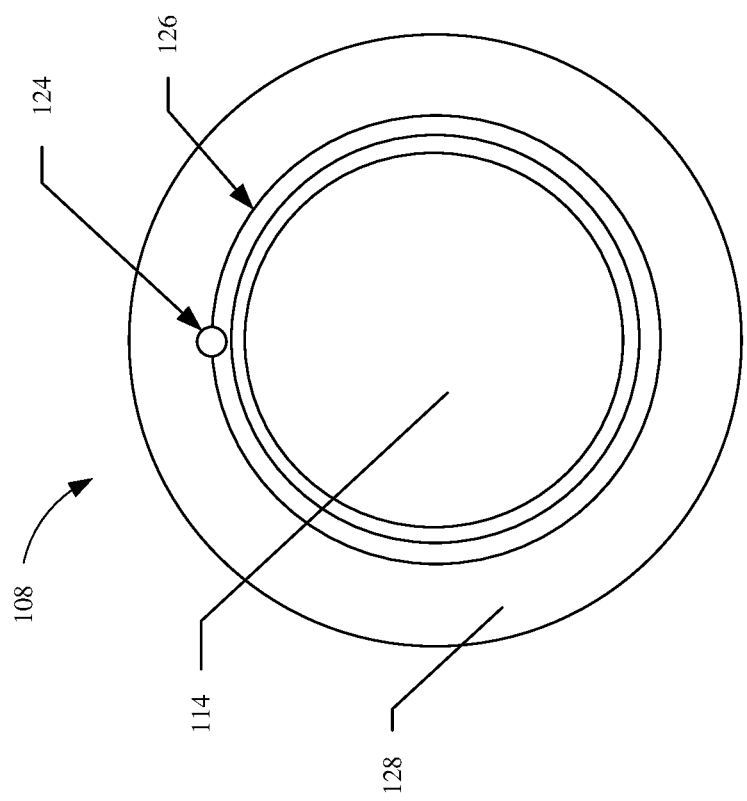
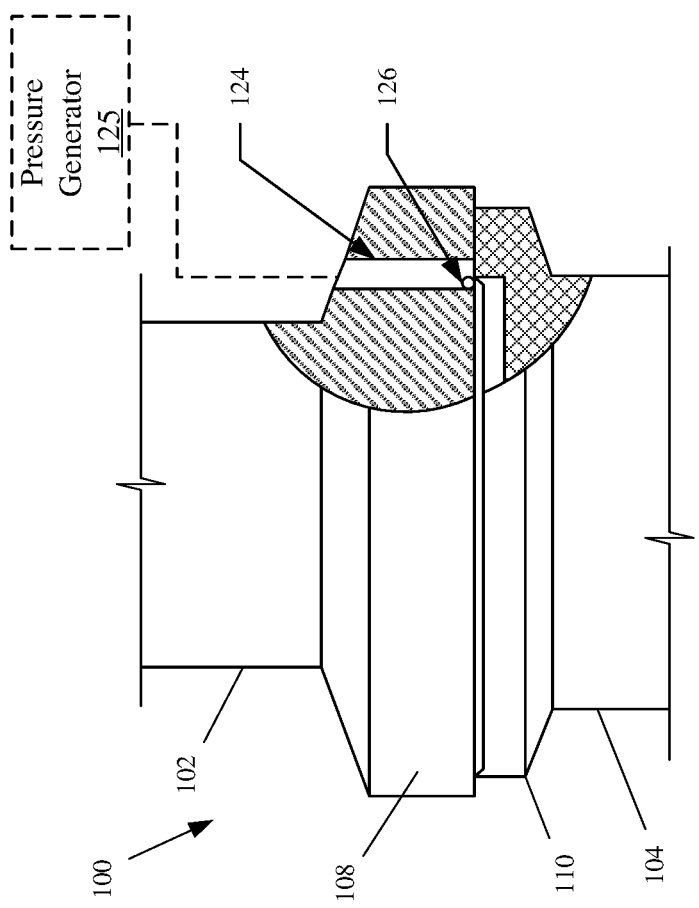
FIG. 4B
FIG. 4A

PROCESS VENTING FEATURE FOR USE IN SENSOR APPLICATIONS WITH A PROCESS FLUID BARRIER

BACKGROUND

Industrial process control systems are used to monitor and control industrial processes which produce or transfer materials, such as process fluids and gases. In such systems, it is typically important to measure "process variables" such as pressure, temperature, flow rate, and others. Process variable transmitters are used to measure such process variables and transmit information related to the measured process variable back to interpretation locations such as a central control room.

Process variable transmitters can be used in a variety of applications, such as: pharmaceutical and biologics synthesis and food production: single use systems, process systems, flow pathways, and final formation; food processing; and other critical sensitive processing environments and/or applications where process fluid integrity is required.

One type of process variable transmitter is a pressure transmitter that measures one or more pressures (such as gauge or absolute pressure) of a process fluid and provides an output related to the measured pressure. The pressure transmitter is configured to store or transmit the pressure information back to a central location such as a control room or other suitable location or device, typically via a wired process communication. However, other techniques, such as wireless communication techniques may be used instead or as well.

SUMMARY

A pressure transmitter includes a housing and a pressure sensor having an electrical characteristic that varies with applied pressure. The pressure sensor is configured to generate a sensor signal indicative of process flow pressure. A transmitter isolation diaphragm is configured to couple to a process barrier seal to convey pressure to the pressure sensor. A flange is coupled to the transmitter isolation diaphragm. The flange includes at least one gas pathway extending inwardly from an outer diameter of the transmitter isolation diaphragm. Electronics are coupled to the pressure sensor to receive the sensor signal and generate an output indicative of the pressure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4A is a partial sectional view showing one example of a process pressure transmitter coupling in accordance with an embodiment of the present invention.

FIG. 4B is a bottom-view showing one example of a flange in accordance with an embodiment of the present invention.

DETAILED DESCRIPTION OF ILLUSTRATIVE EMBODIMENTS

Figure 1:
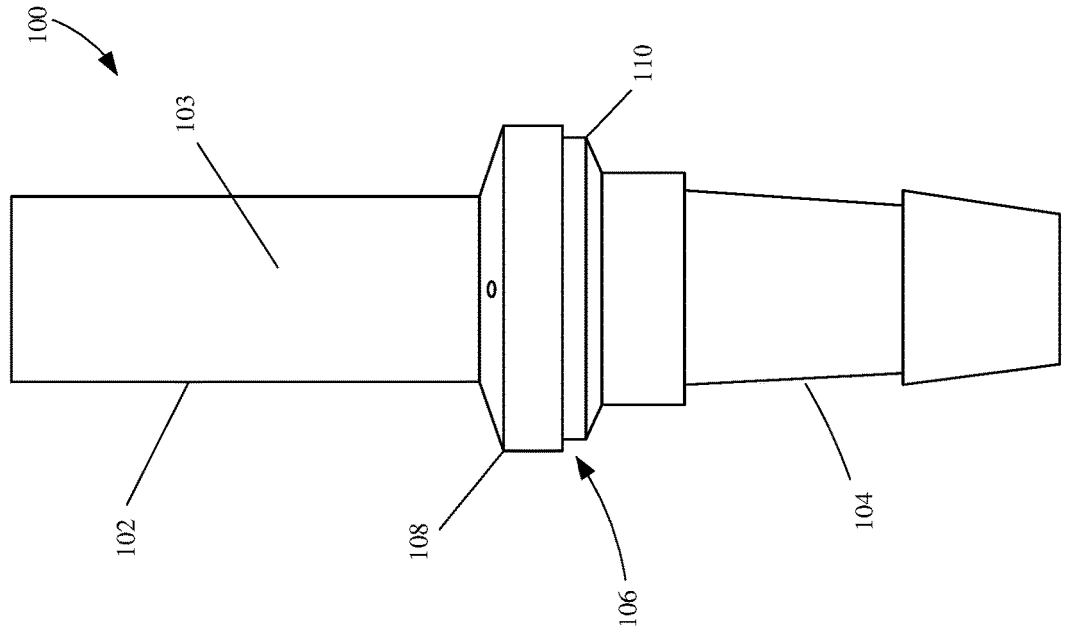
FIG. 1 is a side view of a coupling between a process pressure transmitter and a process connector.

Process pressure transmitters generally sense pressure using a pressure sensor that is fluidically coupled to an isolation diaphragm. The isolation diaphragm isolates the pressure sensor from direct contact with the process fluids that are being sensed. Process fluids, which can be highly corrosive and/or at high temperatures, are thus kept isolated from the pressure sensor in order to avoid corrosion or damage to the pressure sensor. Pressure is transferred from the isolation diaphragm to the pressure sensor using a substantially incompressible, inert fill fluid, such as silicone oil. The pressure sensor itself has a physical structure such as a sensing diaphragm that reacts to the pressure, such as by deforming. The pressure sensor also includes an electrical structure, such as a strain gage or capacitive plate or electrode that reacts to the physical deformation. For example, some known pressure sensors have a deflectable diaphragm that bears a capacitive plate or electrode such that deflection of the diaphragm produces a change in the sensor's capacitance. Still other pressure sensors employ a resistive strain gage structure that is disposed on a brittle deformable silicon substrate. As the silicon substrate deforms in response to the pressure, the resistance of the strain gage changes.

In some process pressure transmitter installations, the pressure transmitter is coupled or otherwise mounted to the process flow such that the pressure sensing assembly can access the process fluid for the purposes of measurement. In some instances, the pressure transmitter is directly mounted to the process flow (e.g. side of a tank wall/directly mounted to conduit) or otherwise coupled to a process connector (e.g. a fluid port) that creates an access point to the process flow, as well as other various process access points. These process connectors can be coupled with a barrier, for example, a diaphragm or chemical seal, which is a device comprising a thin flexible membrane (e.g. a diaphragm), which is generally clamped between two flanges (e.g. the transmitter flange and process connector flange). This seal acts as a barrier between the process fluid and the pressure sensing assembly, which may also comprise a diaphragm (e.g. isolation diaphragm), thus protecting the sensing assembly from damage via the process fluid. Additionally, this barrier provides a seal to the process fluid for safe installation and maintenance of the pressure transmitter installation, as well as maintaining the integrity of the process fluid, particularly in applications where that integrity is vital, for example, biological, pharmaceutical and food processing applications. This barrier, while providing a protective seal, is comprised of a flexible material such that it can respond to pressure from contact with the process fluid and thereby transfer that pressure to the sensing assembly which can comprise an additional diaphragm.

During certain operations (e.g. maintenance/installation) air can become trapped between the process barrier seal and the isolation diaphragm of the pressure transmitter. Generally, a process pressure transmitter, during installation or reconnection after maintenance, is mounted to the process connector (e.g. opening in the side of a tank, manifold, pipe, fluid port, fitting, etc.) in order to access the process fluid. The process pressure transmitter can be coupled to the process connector using a flange assembly, threadably coupled or fastened to the process connector, as well as other suitable coupling techniques (e.g. weld/solder/adhesive). In cases where the process connector has a flexible barrier (e.g. a diaphragm or chemical seal) air and other gases can become caught in between the two surfaces (e.g. the isolation diaphragm of the process pressure transmitter and the process barrier seal) as they meet and is then trapped/sealed within upon coupling.

The presence of an "air gap" between the process connector and the transmitter can affect the accuracy of sensor readings and measurement outputs. If the air is trapped between two diaphragms, for example, that air can expand and contract with changes in temperature and increase the measurement error. Similarly, the compressibility of the air can cause measurement errors. That is, particularly in the case of two diaphragms, the air trapped between them is compressed as a result of pressure on and displacement of the process connector diaphragm (e.g. polymeric diaphragm), which then acts upon the sensing assembly (e.g. isolator diaphragm) resulting in a pressure measurement that is not indicative of an actual pressure of the process fluid. Absent a control (e.g. a known pressure of the process fluid) it is difficult to account for the error caused by trapped air because it is difficult to know, without compromising the seal between the transmitter and process connector, the actual volume of the air trapped in the installation. In other words, the trapped air will exert an unknown amount of tension and cause an immeasurable offset in the sensor output. A process pressure transmitter installation that eliminates or otherwise reduces the measurement errors caused by trapped air is needed. Such a process pressure transmitter installation is provided herein.

FIG. 1 is a perspective view showing one example of a transmitter installation. Installation 100 includes transmitter 102, transmitter housing 103, process connector 104, coupling 106, transmitter flange 108, and process connector flange 110. Transmitter 102 can include various electrical components, housed within transmitter housing 103, including, but not limited to, sensor(s), controller(s), which may comprise a single or multiple microprocessors, various circuitry including measurement and communication circuitry, power supply (e.g. batteries), as well as any other electrical components suitable for measurement and communication of process variables. Transmitter 102 can further include a variety of user interfaces, for example buttons, switches, dials, a touch screen, and other suitable devices configured to receive a user input (e.g. pressing a "STATUS" button). The user interface can include a variety of displays configured to surface or otherwise indicate a condition of transmitter 102 or of the process flow. For example, upon a user hitting a "STATUS" button, a light, electronically coupled to transmitter 102, could illuminate and thereby indicate a certain status of either transmitter 102 or the process flow (e.g. a red flashing light indicating a need for maintenance or calibration). Similarly, a display, such as an LED screen, could indicate the current pressure of the process flow. All of these and more are contemplated herein.

Process pressure transmitter 102 and process connector 104 are sealingly coupled at coupling 106 such that a pressure sensor (not shown) within pressure transmitter 102 is operably coupled to pressure of the process fluid. Process connector 104 has an opening therethrough to allow the process fluid to access an interior of the process connector and thereby be exposed to the sensing assembly. While coupling 106 is shown as a flange assembly, as indicated by transmitter flange 108, and process connector flange 110, coupling 106 could comprise a threaded assembly, with, for example, male and female threads belonging respectively to either transmitter 102 or process connector 104. Coupling 106 can comprise any number of coupling assemblies, for example, a weld, solder, adhesive, and any other suitable techniques for coupling transmitter 102 to process connector 104. The coupling of transmitter 102 to process connector 104 creates an interface between process connector 104's barrier and the sensing assembly of transmitter 102 (e.g. sensing region 114 described below).

As described above, when transmitter 102 and process connector 104 are brought together, air may be trapped between them such that, when process fluid travels from the process flow through the process connector and acts against the process connector barrier (e.g. diaphragm seal), the trapped air causes a measurement error in the pressure measurement as the exerted force acts against the sensing assembly (e.g. isolator diaphragm). Because a process connector barrier is necessary in some processes due to the need to either protect the integrity of the process fluid or to protect the sensing assembly from damage due to high temperature or corrosive chemicals, for example, the simple removal of the barrier is not an option.

Both transmitter 102 and process connector 104 can be formed of any suitable materials including, but not limited to, stainless steel (e.g. 316L stainless steel), plated carbon steel (e.g. nickel plated), alloy M30C, alloy C-276, tantalum, PTFE, Kynar, polymers, Monel, Hastelloy C, PVC, propylene, titanium, carpenter 20, CPVC, and any other suitable materials.

Figure 2:
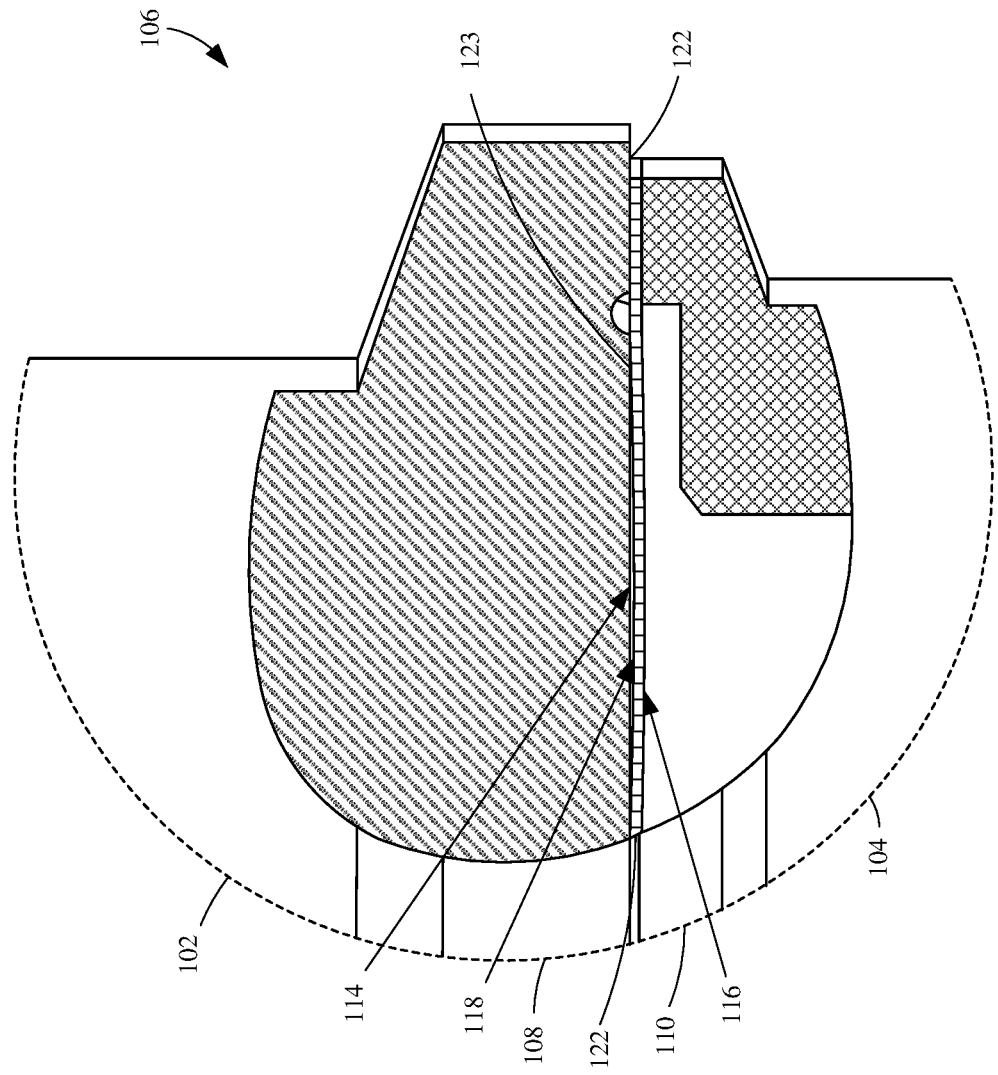
FIG. 2 is an enlarged sectional view showing one example of a coupling between a process pressure transmitter and a process connector.

FIG. 2 is a sectional view showing one example of a coupling between a transmitter and a process connector. Coupling 106 illustrates that the transmitter and process connector are coupled to one another such that an interface is created between two of their respective surfaces (e.g. isolation diaphragm 114 and process barrier seal 116). Coupling 106 includes transmitter 102, process connector 104, transmitter flange 108, process connector flange 110, isolation diaphragm 114, process barrier seal 116, air gap 118, seal 122 and interface 123. Air gap 118, as indicated by the space between isolation diaphragm 114 and process barrier seal 116, is the result of air being trapped between isolation diaphragm 114 and process barrier seal 116 during coupling of transmitter 102 and process connector 104. As transmitter 102 and process connector 104 are coupled to one another (e.g. via flanges 108 and 110) seal 122 is created such that the trapped air cannot escape coupling 106. While coupling 106 is shown (FIG. 1) as comprising flanges 108, 110, in another example, transmitter 102 and process connector 104 can be coupled via threads, or any other suitable technique.

As mentioned above, process barrier seal 116, in one example, provides a fluidic seal between the process flow and transmitter isolation diaphragm 114. In order for transmitter isolation diaphragm 114 to convey the pressure to the pressure sensor, isolation diaphragm 114 and process barrier seal 116 must flex in unison. Thus, process barrier seal 116 is formed of a material flexible enough to respond to pressure (e.g. deflect). Process barrier seal 116 can, in one example, be formed of a polymer or metal. For example, process barrier seal 116 can be formed of steel (e.g. 316 stainless steel), PTFE, polymer, alloy C-276, alloy 400, gold-plated alloy 400, gold-plated stainless steel, Monel, Hastelloy B or C, nickel, carpenter 20, tantalum, or any other suitable materials such that process barrier seal 116 can provide a seal and respond to pressure from process fluids.

Isolation diaphragm 114 is acted upon by the force of the process fluid pressure. Transmitter isolation diaphragm is configured to deform upon exertion of force upon its surface (e.g. the surface area facing the barrier). Isolation diaphragm 114 can, for example, be formed of steel (e.g. 316 stainless steel), PTFE, polymer, alloy C-276, alloy 400, gold-plated alloy 400, gold-plated stainless steel, Monel, Hastelloy B or C, nickel, carpenter 20, tantalum, or any other suitable materials such that isolation diaphragm 114 can deflect and allow the pressure sensor to provide accurate pressure measurements.

As discussed previously, air trapped in air gap 118 can cause errors in the pressure measurement output of sensing assembly because the trapped air will exert an unknown amount of force on isolation diaphragm 114 and cause an immeasurable offset in the sensing assembly's measurement output.

Figure 3:
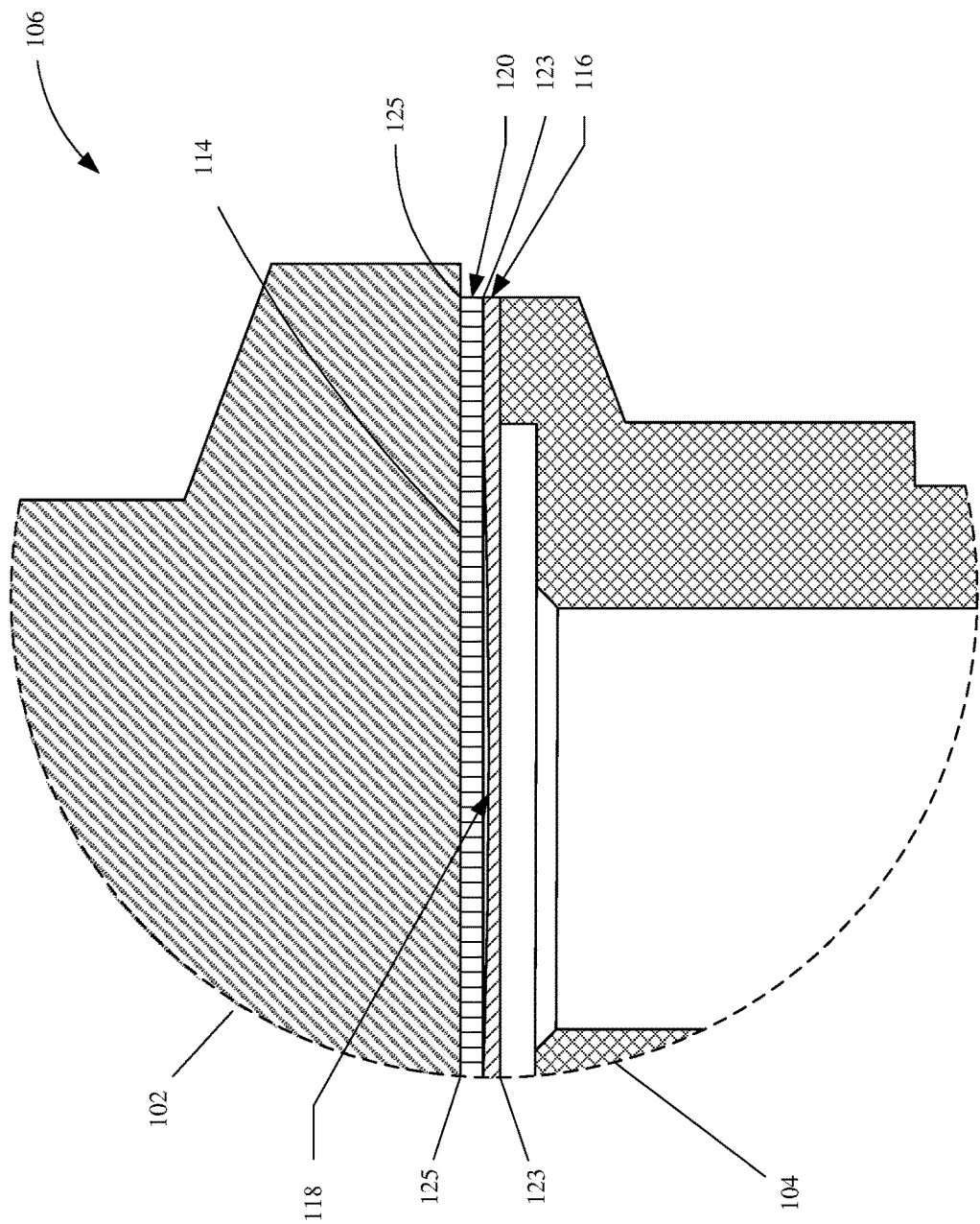
FIG. 3 is an enlarged sectional view showing one example of a coupling between a process pressure transmitter and a process connector in accordance with an embodiment of the present invention.

FIG. 3 is a sectional view showing one example of a coupling between a transmitter and a process connector. FIG. 3 is similar to FIG. 2 and as such like elements are numbered the same. Coupling 106 includes transmitter 102, process connector 104, isolation diaphragm region 114, process barrier seal 116, air gap 118, gas permeable layer 120, seal 123 and seal 125. Gas permeable layer 120 comprises a gas permeable material layer interposed between isolation diaphragm 114 and process barrier seal 116. Air, trapped in air gap 118, will move outward through gas permeable layer 120, thereby venting air gap 118 and removing or reducing the trapped air. In one example, gas permeable layer 120 is a separate component (e.g. a sheet) added to the assembly. In another example, gas permeable layer 120 can be coupled to either isolation diaphragm 114 or process barrier seal 116. In one example, gas permeable layer 120 spans the interface (e.g. 123) between isolation diaphragm 114 and process barrier seal 116, thereby creating an air pathway from the interface between isolation diaphragm 114 and process barrier seal 116 to an exterior of the installation, or at least to an exterior of the interface.

In another example, gas permeable layer 120 is integrally connected to process barrier seal 116. For example, gas permeable layer 120 is bonded to process barrier seal 116 such that an integral assembly is formed. In another example, gas permeable layer 120 forms at least a portion of process barrier seal 116 (e.g. the portion of process barrier seal 116 proximate isolation diaphragm 114 [i.e. top side/top portion of process barrier seal 116]). In another example, gas permeable layer 120 is integrally connected to isolation diaphragm 114. For example, gas permeable layer 120 is bonded to isolation diaphragm 114 such that an integral assembly is formed. In another example, gas permeable layer 120 forms at least a portion of isolation diaphragm 114 (e.g. the portion of isolation diaphragm proximate process barrier seal 116 [i.e. the bottom side/bottom portion of isolation diaphragm 114]).

In another example, process barrier seal 116 comprises a gas permeable material such that air trapped in air gap 118 can diffuse through process barrier seal 116 and into process connector 104, thereby removing or reducing the trapped air. In another example, transmitter flange 108 could also be air permeable (e.g. comprise an air permeable material), at least partially (e.g. in the same area as flange surface 128 shown below or at least a portion proximate to process connector flange 110), such that air trapped in air gap 118 can travel through transmitter flange 108 and diffuse away from isolation diaphragm 114.

In any and/or all of the above examples, an air pathway is created for air and other gases trapped in air gap 118 to travel to an exterior of installation 100, or at least to an exterior of the interface between isolation diaphragm 114 and process barrier seal 116.

FIG. 4A is a partial sectional view showing one example of a transmitter installation. FIG. 4A is similar to FIG. 1 and as such like elements are numbered the same. Installation 100 includes transmitter 102, process connector 104, transmitter flange 108, process connector flange 110, vent 124 and groove 126. In one example, one or more vent holes 124 are machined, or otherwise provided, into transmitter flange 108 to create/define a vent path for the trapped air in air gap 118, thereby removing or reducing the trapped air. In some examples, a groove 126, or other pathway, is machined, or otherwise provided, into the face of transmitter flange 108 to allow trapped air in air gap 118 to travel to and out of vent holes 124.

In some embodiments, one or more vent holes 124 may be coupled to a pressure generator, such as pressure generator 125 shown in FIG. 4A. Pressure generator 125 can be any suitable structure or device that is configured to provide a desired pressure to the vent holes 124. In one particular example, pressure generator 125 is a vacuum source, such as a vacuum pump.

FIG. 4B is a bottom-view showing one example of a flange. Transmitter flange 108 includes sensing region 114, vent hole 124, groove 126 and flange surface 128. As shown, groove 126 is an annular groove machined, or otherwise provided, into the face (i.e. flange surface 128) of transmitter flange 108 that creates/defines a pathway for air (and other gases) trapped between isolation diaphragm 114 and process barrier seal 116 to travel to vent hole 124 where it may escape from installation 100 thereby removing or reducing the air trapped in air gap 118. As shown in the figure, flange surface 128 continues after the groove. Those skilled in the art will appreciate that groove 126 has a height different from flange surface 128, that is the root of groove 126 will be recessed away from flange surface 128.

In another example, vent hole 124 is machined such that, instead of venting through the top of transmitter flange 108 (as shown in FIGS. 4A-B), it would initially vent vertically from groove 126 and then continue substantially horizontally, thereby venting gases out of the side of the flange. This could be advantageous in that any potential fluid that may exit vent hole 124 (e.g. in the case of barrier 116 being compromised) could be directed away from operators or other sensitive components of a process environment. Similarly, in another example, vent hole 124 could be machined such that it travels substantially diagonally from the groove and vents out an exterior surface of transmitter flange 108. In another example, vent hole 124 can be machined in any number of directions or combinations thereof such that a pathway is formed from groove 126 to an exterior of installation 100. In another example, a pressure generation device 125 could be attached to at least one vent hole 124 and be used to actively remove or control the gas pressure between isolation diaphragm 114 and process barrier seal 116.

While FIGS. 4A and 4B show only one vent hole, those skilled in the art will appreciate that any number of vent holes may be used, placed at any number of locations on transmitter flange 108, and that the directionality of each of the separate vent holes may be different from the other (i.e. one venting out the side and one venting out the top).

While groove 126 is shown as an annular groove, in another example, groove 126 could comprise at least one groove extending radially from sensing region 114, defining a pathway for trapped air to travel from air gap 118 to a vent hole (e.g. 124), the vent hole defining a pathway from groove 126 to an exterior of transmitter flange 108.

In any and/or all of the above examples, an air pathway is created for air and other gases trapped in air gap 118 to travel to an exterior of installation 100, or at least to an exterior of the interface between sensing region 114 and barrier 116.

Figure 5:
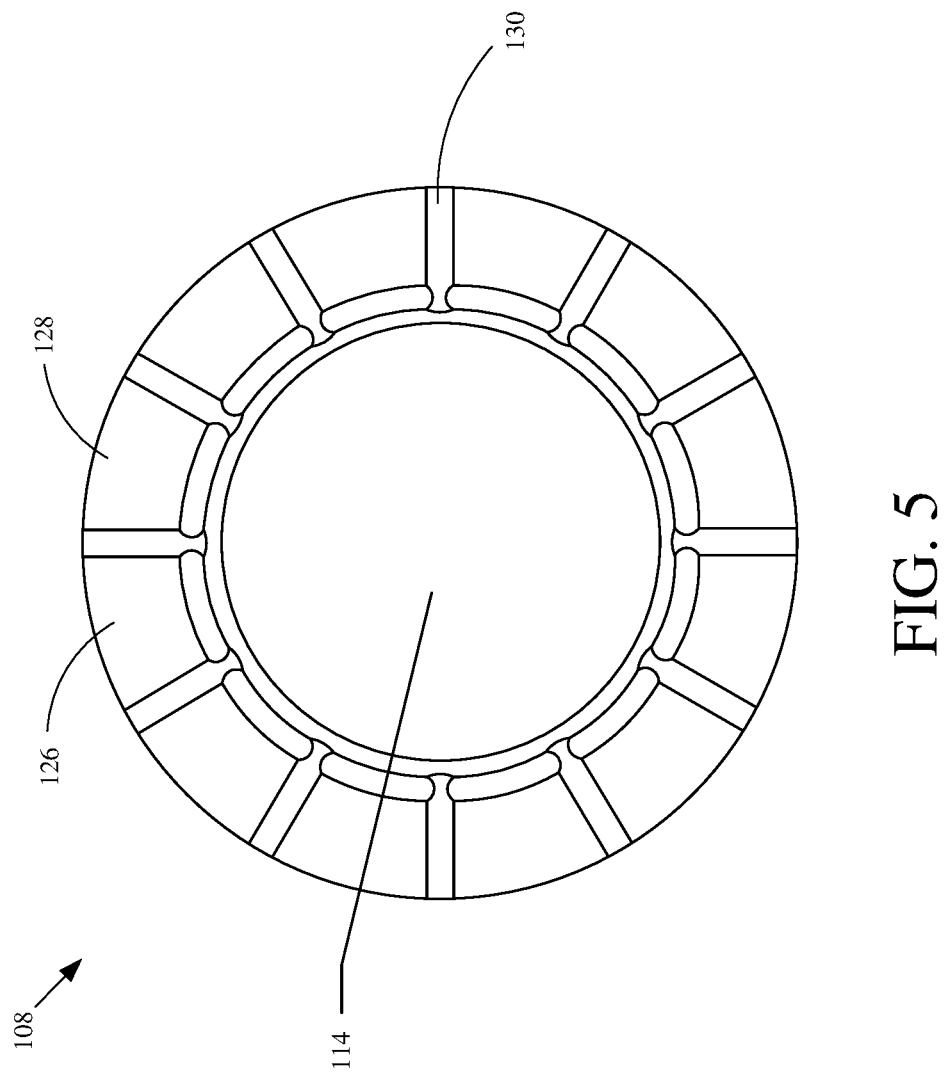
FIG. 5 is a bottom-view showing one example of a flange in accordance with another embodiment of the present invention.

FIG. 5 is a bottom-view showing one example of a flange. Transmitter flange 108 includes isolation diaphragm 114, flange surface 128 and grooves 130. Grooves 130 generally include a radial component. This radial component can be grooves that lie on a path that passes through the center of sensing region, as shown in FIG. 5. In another example, the radial component is provided by one or more grooves that have a decreasing radial distance along the groove 130, such as one or more spiral grooves 130. Grooves 130 are machined, or otherwise provided, into flange surface 128 creating/defining one or more pathways for air (and other gases) to travel from isolation diaphragm 114 to an exterior of transmitter flange 108. While twelve radial grooves are shown, those skilled in the art will appreciate that any number of radial grooves 130 could be implemented and that they can be placed at any location along surface 128. Those skilled in the art will appreciate that grooves 130 have a height different from flange surface 128, that is the roots of grooves 130 will be recessed away from flange surface 128.

Figure 6:
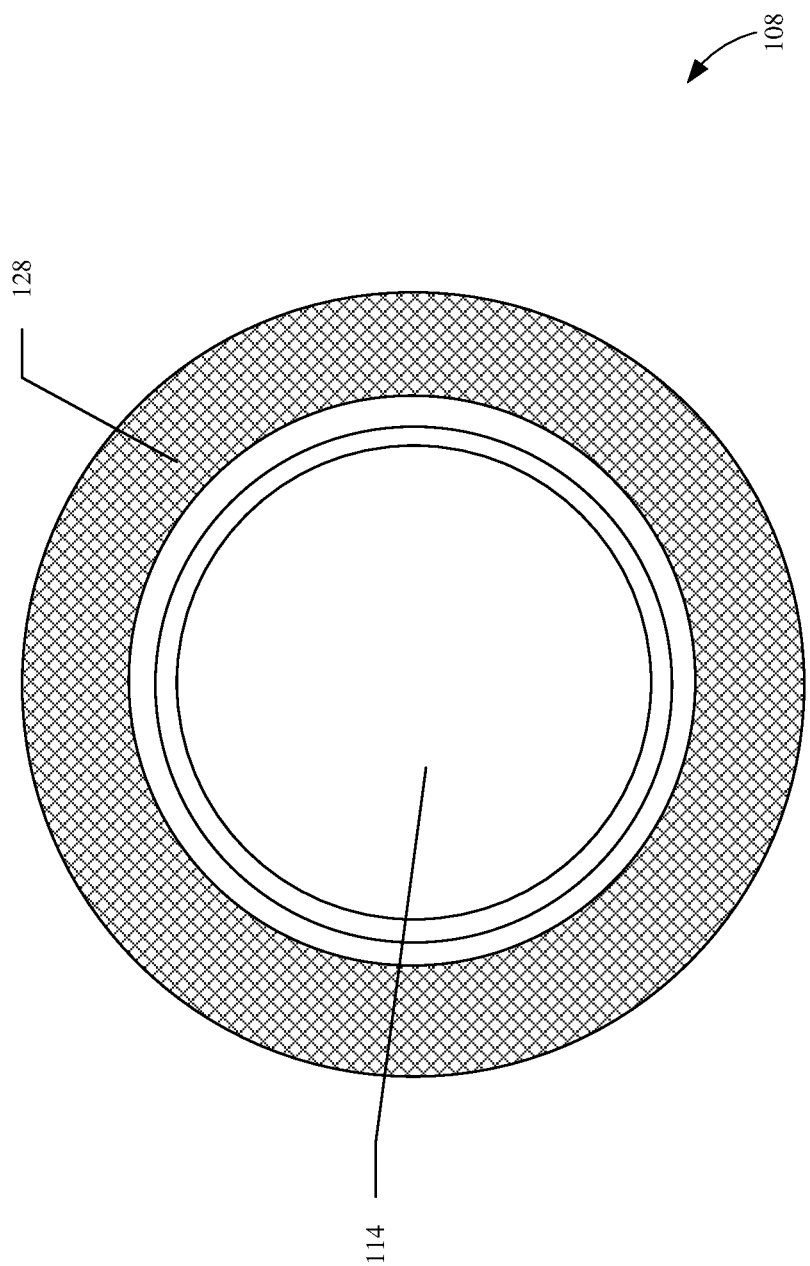
FIG. 6 is a bottom-view showing one example of a transmitter flange in accordance with another embodiment of the present invention.

FIG. 6 is a bottom-view showing one example of a flange. Transmitter flange 108 includes isolation diaphragm 114 and flange surface 128. In one example, the surface roughness of flange surface 128 can be manipulated (e.g. machined) to create an air release surface. In one example, flange surface 128 can have a surface roughness (e.g. rough finish) such that air (and other gases) can escape through the texture of the face (i.e. flange surface 128) rather than through larger features such as vent holes 124 and/or radial grooves 130. The variation in height across flange surface 128 creates pathways for air to travel to an exterior of transmitter flange 108, creating "peaks" and "valleys" as it were. In one example, the variation in height is sufficient to allow for the diffusion of air, while still capable of sufficient coupling of transmitter 102 to process connector 104. Those skilled in the art will appreciate that a variety of patterns could be used on flange surface 128.

In another example the transmitter side (top side) of process barrier seal 116 could have a surface roughness that allows air to diffuse between the transmitter side of process barrier seal 116 and the process side of isolation diaphragm 114, thus allowing air trapped in air gap 118 to escape to an exterior of installation 100. In one example, process barrier seal 116 has a surface roughness that provides pathways for air to travel from air gap 118 to an exterior of installation 100.

In any and/or all of the above examples, an air pathway is created for air and other gases trapped in air gap 118 to travel to an exterior of installation 100, or at least to an exterior of the interface between isolation diaphragm 114 and process barrier seal 116.

Figure 7:
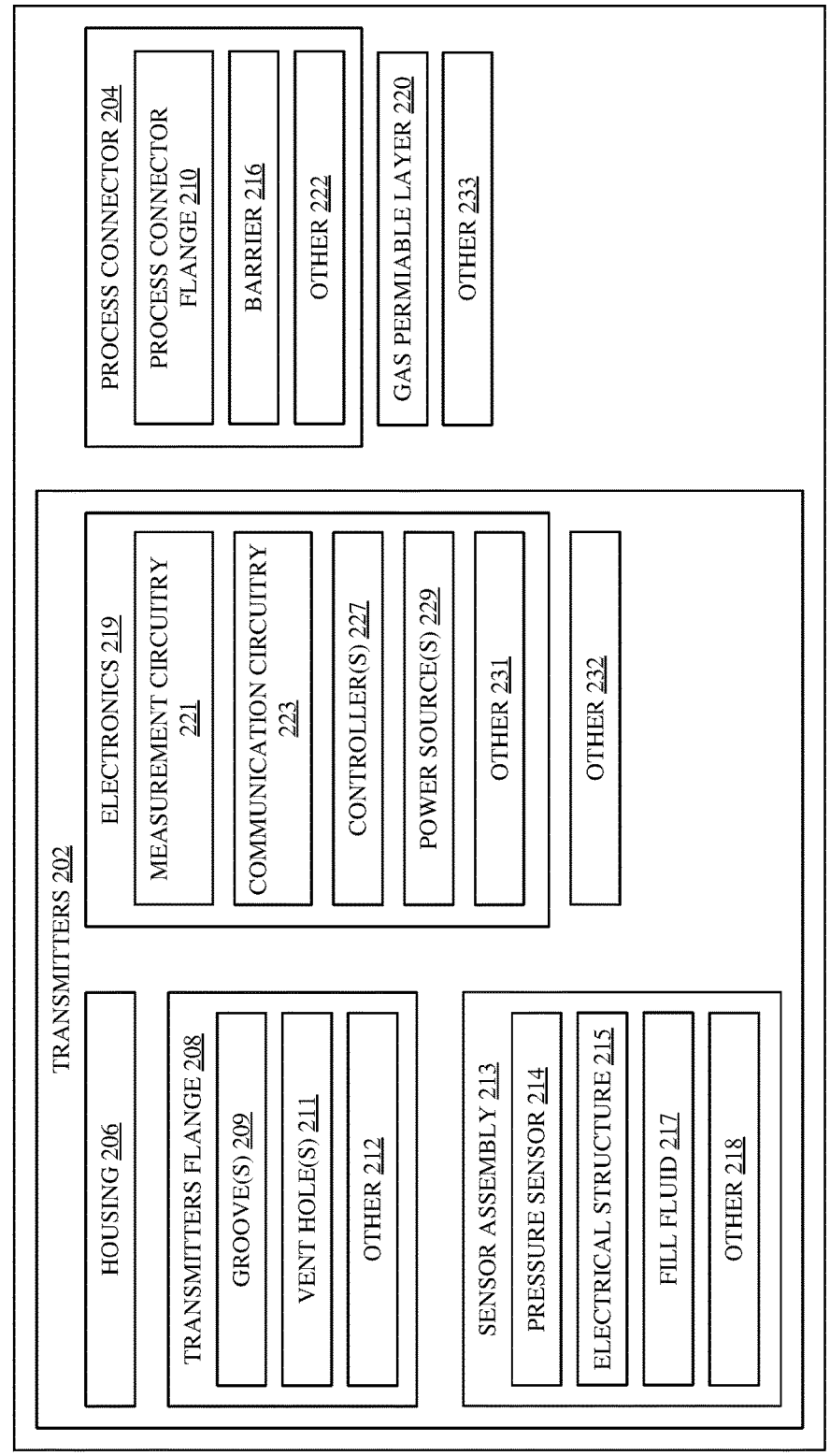
FIG. 7 is a simplified block diagram showing one example of a process fluid measurement system in accordance with an embodiment of the present invention.

FIG. 7 is a simplified block diagram showing one example of a transmitter installation. Installation 200 includes transmitter 202, process connector 204, gas permeable layer 220 and other 232. Transmitter 202 is configured to sense and measure process pressure and generate an output indicative of that pressure. Transmitter 202 includes housing 206, transmitter flange 208, sensor assembly 213, and electronics 219. In one example sensor assembly 212 and electronics 219 are disposed within housing 206. In another example, any combination of the components of sensor assembly 213 and electronics 219 can be disposed within or without housing 206.

Transmitter flange 208 is coupled to housing 206 and includes air (and other gases) pathways such as groove(s) 209, vent hole(s), and other 212. In one example, transmitter flange 208 is an integral part of transmitter housing 206 (e.g. as a whole molded assembly). Groove(s) 209 are, in one example, machined into transmitter flange 208 creating pathways for air and gases trapped between transmitter 202 and process connector 204 to escape to an exterior of installation 200. In one example, groove(s) 209 are machined into the face of transmitter flange 208 (e.g. the surface of transmitter flange 208 configured to face towards process connector 204). In one example, groove(s) 209 comprise an annular groove. In one example, groove(s) 209 comprise at least one radial groove extending radially from sensing region 214 to an exterior of transmitter flange 208.

Vent hole(s) 211 are, in one example, machined into transmitter flange 208 creating pathways for air and gases from groove(s) 209 to an exterior of transmitter flange 208. Vent hole(s) 211 and groove(s) 209, in one example, intersect, such that they open into each other, or, in other words, gases may move freely between them. In one example, vent hole(s) 211 comprise at least one vent hole extending from an annular groove to an exterior of transmitter flange 208. Vent hole(s) 211 can be machined into transmitter flange 208 in a variety of directions, for example, vertically, horizontally and diagonally or any other suitable direction or combinations thereof.

Transmitter flange 208 can also include other air pathways 212. For example, a surface of transmitter flange 208 could have a surface roughness such that "peaks" and "valleys" are formed, creating pathways for air and other gases to travel through and along the surface and to an exterior of transmitter flange 208. In one example, other 212 includes a rough surface finish on the surface of transmitter flange 208 configured to face process connector flange 210. In another example, other 212 includes at least a portion of transmitter flange 208 comprising a gas permeable material such that air and other gases trapped between transmitter 202 and process connector 204 can diffuse through transmitter flange 208 to an exterior of installation 200. In one example, that gas permeable portion of transmitter flange 208 comprises at least the portion of transmitter flange 208 proximate to process connector flange 210.

Sensor assembly 213 includes pressure sensor 214, electrical structure(s) 215, fill fluid 217 and other 218. Pressure sensor 214 is configured to be exposed to a process flow pressure and generate a sensor signal indicative of the sensed pressure. In one example, pressure sensor 214 comprises a sensor diaphragm or surface that is operably coupled to the process fluid pressure by deflection of the isolation diaphragm and fill fluid 217 (e.g. silicone oil). Electrical structure(s) 215 of pressure sensor 214 can include strain gage(s), capacitive plate(s), electrode(s), or any other suitable electrical devices configured to react to the deformation of the pressure sensor in order to generate a sensor signal indicative of a process pressure. Other sensor assembly features 218 can include any other suitable features for a process pressure transmitter, including, but not limited to, additional fluid ports, additional sensing regions (e.g. diaphragms), overpressure protection features, valves, fill fluid ports, et cetera.

Electronics 219 includes measurement circuitry 221, communication circuitry 223, controller(s) 227, power source(s) 229 and other 231. In one example, electronics 219 are electronically coupled to sensing assembly 213 and receive the sensor signal indicative of a process pressure. Measurement circuitry 221 is, in one example, coupled to sensing region 214. Measurement circuitry 221, upon receiving the sensor signal, can perform a variety of operations, including signal conditioning. Signal conditioning can include amplifying the sensor signal, performing filtering, linearization, normalization and/or any other signal conditioning. In one example, measurement circuitry 221 includes an analog-to-digital convertor. In another example, measurement circuitry includes suitable multiplexor circuitry.

Controller(s) 227, which can comprise a number of processors and/or microprocessors, can be coupled to and receive the signal from measurement circuitry 221 and can generate an output based on the received signal. Controller(s) 227 can, in one example, be coupled to communication circuitry 223 to allow controller(s) 227 to communicate with other devices in the process control and monitoring system. Controller(s) 227 can generate control signals to trigger an alert or surface an indication on a user interface or other display (e.g. a pressure reading on a local display).

Communication circuitry 223 can include circuitry that enables controller(s) 227 to communicate in accordance with process industry standard communication protocols such as the Highway Addressable Remote Transducer (HART®) protocol, the FOUNDATION™, Fieldbus protocol, and others. Communication circuitry 223 can, in one example, communicate via a wired loop. In one example, communication circuitry 223 can communicate wirelessly via suitable wireless communication protocol such as IEC 62591 (WirelessHART). Communication circuitry 223 can provide communication of sensor assembly 213 outputs to a local or remote device and/or user interface.

Power source(s) 231 is, in one example, coupled to all components within electronics 219 and can be coupled to all other electrical components of transmitter 202 (e.g. electrical structure 215). Power source(s) 231 can be configured to receive power from a suitable source (e.g. a buildings electrical system via an outlet) and provide voltage adjustment or other suitable power conditioning to the circuitry within electronics 219. In one example, power source(s) 231 may be coupled to a wired process communication loop such that transmitter 202 can receive all of its operating energy from the wired process communication loop. In another example, power source(s) 231 can be coupled to a suitable source of AC or DC power. Additionally, power source(s) can be a local power source, for example, a battery housed within housing 206. Power source(s) can be a combination of both a wired power source and local power source (e.g. a wired connection to a building's electrical system and a local rechargeable backup battery).

Other 232 can include any other suitable devices, mechanisms, circuitry, structures and other components suitable for use in a process transmitter, including, but not limited to, additional sensors (e.g. temperature sensors), displays, user interfaces, pumps, valves, gaskets, fasteners, electrical components, etc.

Process connector 204 includes process connector flange 210, barrier 216 and other 222. Process connector flange 210 can, in one example, be coupled to process connector 204. Process connector can comprise any number of suitable devices or structures configured to allow transmitter 202 suitable access to the process flow for purposes measurement, analysis and/or control, including but not limited to a manifold, pipe, process port, fitting, etc. Process connector flange 210 is configured to couple to transmitter flange 208, via bolts or other suitable fasteners. Process connector flange 210 has a surface configured to face towards transmitter flange 208, and in one example that surface (i.e. the face) has an inner diameter defining a surface area of barrier 216. While, for purposes of illustration, installation 200 is shown to include a flange coupling between transmitter 202 and process connector 204, other forms of coupling are contemplated herein, including, but not limited to threaded coupling, welding, brazing, adhesives, etc.

Process barrier seal 216 is configured to provide a fluidic seal between the process fluid and an isolation diaphragm of the transmitter. Process barrier seal 216 can comprise a device suitable to seal a material flexible enough to respond to pressure (e.g. deflect). Process barrier seal 216 can be a polymeric diaphragm. In one example, process barrier seal 216 includes a surface ("top side/surface") configured to face towards a transmitter isolation diaphragm. When transmitter 202 and process connector 204 are coupled to one another, an interface is created between process barrier seal 216 and the transmitter isolation diaphragm. Air and other gases can become trapped within this interface creating an air gap (e.g. air gap 118) which can affect the measurement performance of transmitter 202. In one example, the top side/surface of barrier 216 has a surface roughness such that air and other gases can flow through process barrier seal 216 to an exterior of installation 200 thereby venting the air gap. In another example, at least a portion of process barrier seal 216 comprises a gas permeable material such that air and other gases trapped in the air gap can diffuse away from the air gap and into process connector 204.

Other 222 includes any other devices, mechanisms and structures suitable for use in a process connector, including, but not limited to, fittings, fasteners, mounting adapters, gaskets, o-rings, threads, valves, etc.

Gas permeable layer 220 can be a gas permeable material layer interposed between the transmitter isolation diaphragm and process barrier seal 216 such that air trapped between the transmitter isolation diaphragm and process barrier seal 216 can diffuse or otherwise flow through gas permeable layer 220 to an exterior of installation 200. In one example, gas permeable layer 220 is a separate component (e.g. a sheet) added to the assembly, spanning the interface between the isolation diaphragm and process barrier seal 216. In another example, gas permeable layer 220 is integrally connected to process barrier seal 216. For example, gas permeable layer 220 is bonded (or otherwise coupled) to process barrier seal 216 such that an integral assembly is formed. In another example, gas permeable layer 220 forms at least a portion of process barrier seal 216, including, but not limited to, the portion of process barrier seal 216 proximate the isolation diaphragm.

Other 233 can include any other devices, mechanisms, components or structures suitable for a process pressure transmitter installation, including, but not limited to, fittings, mounting adapters, fasteners, seals, gaskets, o-rings, electrical components, displays, user interfaces, valves, additional sensors (e.g. temperature sensors), etc. In one example, installation 200 could include a passive flow control (e.g. a check valve) configured to prevent repressurization of the air gap between the isolation diaphragm and process barrier seal 216. In another example, transmitter flange 208 could include a specific vent hole that can be coupled to a pressure-generation device used to actively remove or control the gas pressure between isolation diaphragm and the process barrier seal 216, and in such a case, transmitter flange 208 can intentionally seal to the barrier. In one example, transmitter flange 208 could comprise two or more components (e.g. two or more portions of the flange body) that mechanically lock together but are not gas tight, thus allowing air and other gases within the air gap to vent to an exterior of installation 200.

Figure 8:
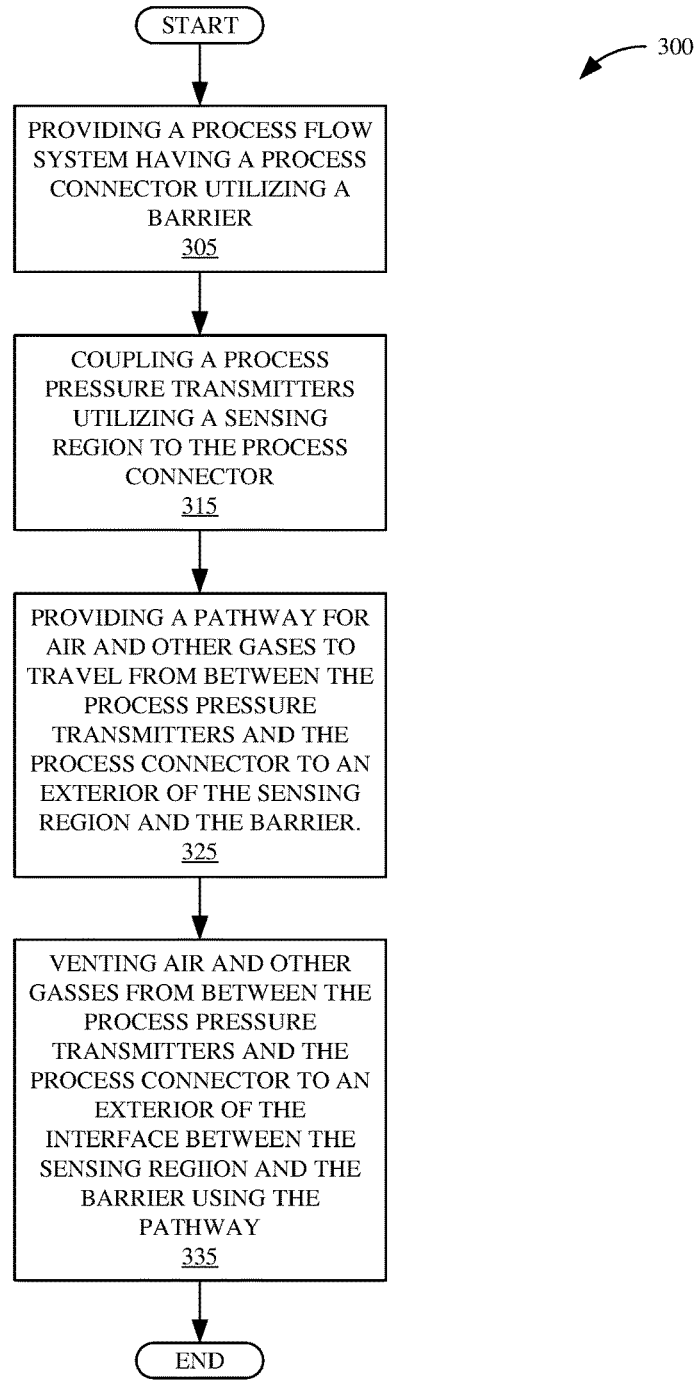
FIG. 8 is a flow diagram a method of venting air within a process pressure transmitter installation in accordance with an embodiment of the present invention.

FIG. 8 is a flowchart showing one example of venting air within a transmitter installation. Method 300 begins at block 305 where a process flow system having a process connector utilizing a barrier is provided. The process flow system can include any number of mechanisms, devices, components or structures, such as, but not limited to, conduits, pipes, tubes, fluid tanks, gages, valves, sensors, electrical components, fasteners, fittings, and any other mechanisms, devices, components or structures suitable for a process flow system. The process connector can comprise and/or include any number of devices, mechanisms, components or structures including, but not limited to, a flange, threads, a fluid port, a fitting, a mounting adapter, a manifold, a pipe, a tube, a valve and/or any other mechanisms, devices, components or structures suitable for a process connector. The barrier can comprise a diaphragm, for example a diaphragm seal, and/or any other mechanisms, devices, components or structures suitable to provide a fluidic seal between a process flow and a transmitter while being responsive to a process flow pressure.

Method 300 continues at block 315 where a process pressure transmitter utilizing an isolation diaphragm is coupled to the process connector. In one example, the process pressure transmitter is coupled to the process connector via a flange assembly, whereby a process pressure transmitter flange (coupled to the process pressure transmitter) is coupled to a process connector flange thereby creating an interface between the isolation diaphragm of process pressure transmitter and a process barrier seal of the process connector. In some instances, during coupling of the process pressure transmitter and the process connector, air and other gases are trapped between the isolation diaphragm and the process barrier seal.

Method 300 continues at block 325 where a pathway for air and other gases to travel from between the process pressure transmitter and the process connector to an exterior of the interface between the isolation diaphragm and the process barrier seal. In one example the pathway comprises at least one groove machined, or otherwise provided, into the surface of the process pressure transmitter flange configured to face the process connector. In one example the at least one groove is an annular groove. In another example the at least one groove is a radial groove extending from the interface between the sensing region and the barrier to an exterior of the interface, for example, to an exterior of the transmitter flange. In one example, the pathway comprises at least one vent hole extending from the at least one groove to an exterior of the transmitter flange. In one example the at least one vent hole extends substantially vertically from the at least one groove, however other directions are contemplated herein, including, but not limited to, horizontally, diagonally or any other suitable direction or any combination thereof.

Method 300 continues at block 335 where air and other gases are vented from between the process pressure transmitter and the process connector to an exterior of the interface between the isolation diaphragm and the process barrier seal using the pathway.

It is noted that while process pressure transmitters and process pressure transmitter installations have been particularly discussed with respect to the examples described herein, other transmitters and transmitter installations can also be implemented with said examples, and thus the present disclosure is not limited to use of the systems and processes discussed with merely process pressure transmitters and/or process pressure transmitter installations.

It should also be noted that the different examples described herein can be combined in different ways. That is, parts of one or more examples can be combined with parts of one or more other examples. All of this is contemplated herein.

Although the present invention has been described with reference to preferred embodiments, workers skilled in the art will recognize that changes may be made in form and detail without departing from the spirit and scope of the invention.

What is claimed is:

1. A pressure transmitter comprising:
   a housing;
   a pressure sensor having an electrical characteristic that varies with applied pressure, the pressure sensor being configured to generate a sensor signal indicative of process flow pressure;
   a transmitter isolation diaphragm configured to couple to a process barrier seal to convey pressure to the pressure sensor;
   a flange coupled to the transmitter isolation diaphragm, wherein the flange includes at least one gas pathway extending from an outer diameter of the transmitter isolation diaphragm; and
   electronics coupled to the pressure sensor to receive the sensor signal and generate an output indicative of the pressure.

2. The pressure transmitter of claim 1, wherein the electronics includes a microprocessor configured to receive the sensor signal and calculate the output.

3. The pressure transmitter of claim 1, wherein the at least one gas pathway is defined on a surface of the transmitter flange.

4. The pressure transmitter of claim 1, wherein the at least one gas pathway includes a radial component.

5. The pressure transmitter of claim 4, wherein the gas pathway includes a groove extending from the outer diameter of the transmitter isolation diaphragm.

6. The pressure transmitter of claim 4, wherein the gas pathway includes a spiraled groove extending from the outer diameter of the transmitter isolation diaphragm.

7. The pressure transmitter of claim 1 and further comprising a vent hole extending from the gas pathway to an exterior of the pressure transmitter.

8. The pressure transmitter of claim 7, wherein the vent hole is coupled to a pressure generator to control pressure.

9. The pressure transmitter of claim 8, wherein the pressure generator is a vacuum generator.

10. The pressure transmitter of claim 1, wherein the gas pathway is formed by a surface roughness of the transmitter isolation diaphragm.

11. A pressure transmitter installation comprising:
a transmitter housing;
electronics disposed within the transmitter housing;
a transmitter flange coupled to the transmitter housing and having a transmitter isolation diaphragm;
a process connector, couplable to a process fluid, the process connector having a process seal diaphragm;
a process connector flange coupled to the process connector;
a pressure sensor disposed within the transmitter housing and being coupled to the electronics, the pressure sensor having an electrical characteristic that changes with applied pressure; and
a gas permeable layer disposed between the transmitter isolation diaphragm and the process seal diaphragm.

12. The pressure transmitter installation of claim 11, wherein the gas permeable layer comprises a gas permeable material layer interposed between the transmitter isolation diaphragm and the process seal diaphragm.

13. The pressure transmitter installation of claim 11, wherein the gas permeable layer forms at least a portion of one of the transmitter isolation diaphragm and process seal diaphragm.

14. The process pressure transmitter installation of claim 11, wherein the gas permeable layer forms at least a portion of the transmitter isolation diaphragm.

15. The pressure transmitter installation of claim 11, wherein the gas permeable layer comprises the top side of the process seal diaphragm.

16. The pressure transmitter installation of claim 15, wherein the top side of the process seal diaphragm includes an air release surface formed by a surface roughness of the gas permeable layer.

17. A method of venting air within a pressure transmitter installation comprising:
providing a fluid system having a process connector, the process connector having a process barrier diaphragm;
coupling a pressure transmitter to the process connector by bringing a transmitter isolation diaphragm into contact with the process barrier diaphragm to create an interface therebetween;
providing a gas pathway to allow gas to escape from the interface; and
venting gas from the interface.

18. The method of claim 17, wherein the gas pathway comprises a groove.

19. The method of claim 17, wherein the gas pathway comprises a gas permeable material.

20. The method of claim 17, and further comprising operably coupled a vacuum source to the gas pathway.

* * * * *